United States Patent
Chen et al.

(10) Patent No.: US 12,098,260 B2
(45) Date of Patent: Sep. 24, 2024

(54) POLYOL PRE-MIXES HAVING IMPROVED SHELF LIFE

(71) Applicant: Arkema Inc., King of Prussia, PA (US)

(72) Inventors: Benjamin Bin Chen, King of Prussia, PA (US); Joseph S. Costa, King of Prussia, PA (US); Sri R. Seshadri, King of Prussia, PA (US); Laurent Abbas, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 17/972,664

(22) Filed: Oct. 25, 2022

(65) Prior Publication Data

US 2023/0126554 A1 Apr. 27, 2023

Related U.S. Application Data

(63) Continuation of application No. 15/164,925, filed on May 26, 2016, now abandoned.

(60) Provisional application No. 62/220,329, filed on Sep. 18, 2015.

(51) Int. Cl.
| | |
|---|---|
| *C08J 9/14* | (2006.01) |
| *C08G 18/09* | (2006.01) |
| *C08G 18/18* | (2006.01) |
| *C08G 18/40* | (2006.01) |
| *C08G 18/42* | (2006.01) |
| *C08G 18/48* | (2006.01) |
| *C08G 18/76* | (2006.01) |

(52) U.S. Cl.
CPC ............ *C08J 9/144* (2013.01); *C08G 18/092* (2013.01); *C08G 18/1808* (2013.01); *C08G 18/1816* (2013.01); *C08G 18/4018* (2013.01); *C08G 18/42* (2013.01); *C08G 18/4208* (2013.01); *C08G 18/4812* (2013.01); *C08G 18/4825* (2013.01); *C08G 18/4829* (2013.01); *C08G 18/7664* (2013.01); *C08G 2110/0025* (2021.01); *C08G 2110/005* (2021.01); *C08J 2201/022* (2013.01); *C08J 2203/142* (2013.01); *C08J 2205/052* (2013.01); *C08J 2205/06* (2013.01); *C08J 2205/10* (2013.01); *C08J 2375/06* (2013.01); *C08J 2375/08* (2013.01)

(58) Field of Classification Search
CPC .............. C08G 18/092; C08G 18/1808; C08G 18/1816; C08G 18/4018; C08G 18/42; C08G 18/4208; C08G 18/4812; C08G 18/4825; C08G 18/4829; C08G 18/7664; C08G 2110/0025; C08G 2110/005; C08J 9/144; C08J 2201/022; C08J 2203/142; C08J 2205/052; C08J 2205/06; C08J 2205/10; C08J 2375/06; C08J 2375/08
See application file for complete search history.

(56) References Cited

U.S. PATENT DOCUMENTS

| | | | |
|---|---|---|---|
| 3,299,151 A | 1/1967 | Wismer | ................. C08G 18/28 521/176 |
| 3,746,663 A | 7/1973 | Beale et al. | |
| 4,021,385 A | 5/1977 | Austin et al. | |
| 4,219,624 A | 8/1980 | Fuzesi | |
| 4,430,490 A | 2/1984 | Doerge et al. | |
| 4,986,930 A | 1/1991 | Lund et al. | |
| 8,541,478 B2 | 9/2013 | Singh et al. | |
| 8,691,107 B2 | 4/2014 | Elsheikh et al. | |
| 8,937,107 B2 | 1/2015 | Singh et al. | |
| 9,051,442 B2 | 6/2015 | Williams et al. | |
| 9,156,936 B2 | 10/2015 | Villa et al. | |
| 9,238,721 B2 | 1/2016 | Singh et al. | |
| 9,238,722 B2 | 1/2016 | Singh et al. | |
| 2008/0161437 A1 | 7/2008 | Nandi | |
| 2009/0099272 A1 | 4/2009 | Williams | ............. C08G 18/089 521/85 |
| 2009/0099273 A1 | 4/2009 | Willams et al. | |
| 2009/0099274 A1 | 4/2009 | Van Der Puy et al. | |
| 2010/0222444 A1 | 9/2010 | Kometani et al. | |
| 2011/0124756 A1 | 5/2011 | Singh | ................. C08G 18/1808 521/131 |
| 2011/0303867 A1 | 12/2011 | Ling et al. | |
| 2012/0202904 A1 | 8/2012 | Chen | ........................ C08J 9/146 521/131 |

(Continued)

FOREIGN PATENT DOCUMENTS

| | | |
|---|---|---|
| DE | 41 11 795 A1 | 10/1992 |
| WO | WO 2010/034591 A1 | 4/2010 |
| WO | WO 2015/110404 A1 | 7/2015 |

OTHER PUBLICATIONS

Weil, Edward D. & Levchik, Sergei V., "Commercial Flame Retardancy of Polyurethanes", Journal of Fire Sciences, SAGE Publications; 2004; 22; DOI: 10.1177/0734904104040259; pp. 183-210.

(Continued)

*Primary Examiner* — John M Cooney

(74) *Attorney, Agent, or Firm* — David Weisberg

(57) ABSTRACT

A polyol pre-mix containing at least one halogenated hydroolefin blowing agent and having improved shelf life stability is provided, wherein each polyol combined with the halogenated hydroolefin blowing agent has an apparent pH of between 3 and 11.4. Controlling the apparent pH of the polyol(s) enables the polyol pre-mix to be stored for extended periods of time and then used in combination with organic polyisocyanate to produce foam formulations having gel times and tack free times not significantly different from those exhibited when freshly prepared polyol pre-mix is used.

17 Claims, No Drawings

(56) References Cited

U.S. PATENT DOCUMENTS

| | | | |
|---|---|---|---|
| 2013/0041048 A1 | 2/2013 | Chen | ............... C08G 18/4018 |
| | | | 516/12 |
| 2013/0197115 A1 | 8/2013 | Giesker | ............... C08J 9/146 |
| | | | 521/131 |
| 2013/0210946 A1 | 8/2013 | Ling et al. | |
| 2014/0005288 A1 | 1/2014 | Chen et al. | |
| 2014/0051776 A1 | 2/2014 | Chen et al. | |
| 2014/0113984 A1* | 4/2014 | Burdeniuc | ............... C08J 9/02 |
| | | | 521/131 |
| 2014/0213677 A1 | 7/2014 | Jimenez et al. | |
| 2015/0051304 A1 | 2/2015 | Shieh | |
| 2015/0197614 A1 | 7/2015 | Chen | ............... C08G 18/6674 |
| | | | 521/112 |
| 2016/0075817 A1 | 3/2016 | Burdeniuc et al. | |
| 2016/0145357 A1 | 5/2016 | Karlsson et al. | |
| 2016/0145374 A1 | 5/2016 | Ishikawa | |
| 2017/0002165 A1 | 1/2017 | Riccio et al. | |

OTHER PUBLICATIONS

Carpenter: CARPOL GSP-280 Polyol ERC-04027; Version 1.0; Safety Data Sheet; pp. 1-8; Feb. 17, 2015.
Carpenter Polyol Product Description—Brochure (2017).

\* cited by examiner

POLYOL PRE-MIXES HAVING IMPROVED SHELF LIFE

The present application is a continuation of U.S. patent application Ser. No. 15/164,925 filed May 26, 2016 which claims priority to U.S. Provisional Patent Application Ser. No. 62/220,329 filed Sep. 18, 2015.

FIELD OF THE INVENTION

The present invention relates to a method of improving the shelf life of polyol pre-mixes that contain halogenated hydroolefin blowing agents, including hydrochlorofluoroolefin blowing agents such as HCFO-1233zd.

BACKGROUND OF THE INVENTION

The Montreal Protocol for the protection of the ozone layer mandated the phase out of the use of chlorofluorocarbons (CFCs). Materials more "friendly" to the ozone layer, such as hydrofluorocarbons (HFCs), e.g., HFC-134a, replaced chlorofluorocarbons. The latter compounds have proven to be greenhouse gases, causing global warming and are subject to reduction that is coordinated by the United Nations Framework Convention on Climate Change (UNFCCC). The emerging replacement materials, hydrofluoropropenes, were shown to be environmentally acceptable as they have zero ozone depletion potential (ODP) and acceptable low global warming potential (GWP).

Currently used blowing agents for thermoset foams include HFC-134a, HFC-245fa, HFC-365mfc (that have relatively high global warming potential) and hydrocarbons such as pentane isomers (that are flammable and have low energy efficiency). Therefore, new alternative blowing agents are being sought. Halogenated hydroolefinic materials such as hydrofluoropropenes and/or hydrochlorofluoropropenes have generated interest as replacements for HFCs. The inherent chemical instability of these materials in the lower atmosphere provides for a low global warming potential and zero or near zero ozone depletion properties desired.

However, the preparation of satisfactory thermoset foams using such halogenated hydroolefinic materials as blowing agents can be challenging, due to certain shelf-life issues. In commercial practice, blowing agents typically are combined with polyols and possibly other components such as surfactant and catalyst to form so-called "B-side" pre-mixes that are then stored for several days to several months prior to being combined with an "A-side" component containing a reactant such as isocyanate that is capable of reacting with the polyol to form a thermoset foam. Ideally, the characteristics of the thermoset foam thereby obtained should not be significantly affected by the length of time the polyol premix has aged prior to such use. However, as disclosed by US 2009/0099272 A1, "A shortcoming of two-component systems, especially those using certain hydrohaloolefins, including, HFO-1234ze and HFCO-1233zd is the shelf-life of the B-side composition. Normally when a foam is produced by bringing together the A and B component, a good foam is obtained. However, if the polyol premix composition is aged, prior to treatment with the polyisocyanate, the foam are of lower quality and may even collapse during the formation of foam."

SUMMARY OF THE INVENTION

It was unexpectedly discovered that selecting and controlling the apparent pH of polyols present in a halogenated hydroolefin blowing agent-containing pre-mix to be stored for some period of time, prior to being combined with an isocyanate or other reactant to form a thermoset foam, improves the shelf life of the pre-mix.

A first embodiment of the invention provides a polyol pre-mix comprising:
a) at least one blowing agent, including at least one halogenated hydroolefin blowing agent; and
b) a polyol component comprised of at least one polyol;
wherein each polyol of the polyol component has an apparent pH of at least 3 but no greater than 11.4.

In a second embodiment, each polyol of the polyol component has an apparent pH of at least 4 but no greater than 11.

In a third embodiment, each polyol of the polyol component has an apparent pH of at least 4 but no greater than 10.

In a fourth embodiment, each polyol of the polyol component has an apparent pH of at least 4 but no greater than 9.

In a fifth embodiment, the polyol component in any of the first through fourth embodiments is comprised of one more polyols selected from the group consisting of polyether polyols, polyester polyols, polyether/ester polyols and combinations thereof.

In a sixth embodiment, the polyol component in any of the first through fifth embodiments is comprised of one or more polyols having functionalities of from 2 to 7.

In a seventh embodiment, the polyol component in any of the first through sixth embodiments is comprised of at least one polyether polyol and at least one polyester polyol.

In an eighth embodiment, the polyol component in any of the first through sixth embodiments contains 0 to 100 parts by weight polyester polyol per 100 parts by weight total polyol component and 100 to 0 parts by weight polyether polyol per 100 parts by weight total polyol component.

In a ninth embodiment, the polyol component in any of the first through seventh embodiments contains 10 to 90 parts by weight polyester polyol per 100 parts by weight total polyol component and 90 to 10 parts by weight polyether polyol per 100 parts by weight total polyol component.

In a tenth embodiment, the polyol component in any of the first through seventh embodiments contains 20 to 80 parts by weight polyester polyol per 100 parts by weight total polyol component and 80 to 20 parts by weight polyether polyol per 100 parts by weight total polyol component.

In an eleventh embodiment, the polyol component in any of the first through seventh or ninth or tenth embodiments is comprised of at least one polyether polyol and at least one aromatic polyester polyol.

In a twelfth embodiment, each polyol of the polyol component in any of the first through eleventh embodiments has a viscosity of from 400 to 60,000 cps at 25° C.

In a thirteenth embodiment, each polyol of the polyol component in any of the first through twelfth embodiments has a number average molecular weight of from 250 to 6500 Daltons.

In a fourteenth embodiment, the at least one halogenated hydroolefin blowing agent in the polyol pre-mix of any of the first through thirteenth embodiments is selected from the group consisting of hydrofluoroolefins, hydrochlorofluoroolefins, and combinations thereof.

In a fifteenth embodiment, the at least one halogenated hydroolefin blowing agent in the polyol pre-mix of any of the first through fourteenth embodiments includes HFCO-1233zd.

In a sixteenth embodiment, the polyol pre-mix of any of the first through fifteenth embodiments is additionally comprised of at least one surfactant.

In a seventeenth embodiment, the polyol pre-mix of any of the first through sixteenth embodiments is additionally comprised of at least one catalyst.

In an eighteenth embodiment, the polyol pre-mix of any one of the first through fifteenth embodiments is additionally comprised of at least one surfactant and at least one catalyst.

In a nineteenth embodiment, a polyurethane or polyisocyanurate foam is provided which is the reaction product of a polyol pre-mix in accordance with any one of the first through eighteenth embodiments and at least one organic polyisocyanate.

In a twentieth embodiment, a method of making a polyurethane or polyisocyanurate foam is provided which comprises reacting a polyol pre-mix in accordance with any one of the first through eighteenth embodiments and at least one organic polyisocyanate.

In a twenty-first embodiment, the method of the twentieth embodiment is carried out such that the polyol pre-mix is prepared by blending the at least one blowing agent and the polyol component and aging the resulting polyol pre-mix for at least one month at ambient temperature prior to reacting the polyol pre-mix with the at least one organic polyisocyanate.

In a twenty-second embodiment, a method of making a polyol pre-mix having improved shelf life is provided, wherein the method comprises selecting a polyol or plurality of polyols, measuring the apparent pH of each polyol, confirming that the measured apparent pH of each polyol is within the range of 3 to 11.4, and combining the polyol or plurality of polyols with at least one blowing agent, including at least one halogenated hydroolefin blowing agent, to form the polyol pre-mix.

In a twenty-third embodiment, the method of the twenty-second embodiment comprises an additional step of adjusting the apparent pH of at least one polyol prior to combining the polyol or plurality of polyols with the at least one halogenated hydroolefin blowing agent.

In a twenty-fourth embodiment, the method of the twenty-third embodiment is performed such that the adjusting of the apparent pH is carried out by combining the polyol with at least one $H^+$ containing compound such as an organic acid, inorganic acid, or combination of organic acid and inorganic acid.

DETAILED DESCRIPTION OF THE INVENTION

The present invention relates to polyol pre-mixes which have improved shelf life. That is, the pre-mixes, which contain polyol and halogenated hydroolefin blowing agent, are capable of being stored at ambient conditions for extended periods of time without significant changes in their performance when used to prepare thermoset foams.

The blowing agent in the pre-mixes of the present invention comprises one or more halogenated hydroolefins such as hydrofluoroolefins (HFOs) and/or hydrochlorofluoroolefins (HCFOs), optionally in combination with one or more other types of blowing agents such as hydrofluorocarbons (HFCs), hydrofluoroethers (HFEs), hydrocarbons, alcohols, aldehydes, ketones, ethers/diethers or carbon dioxide.

Thus, in one embodiment, the blowing agent in the pre-mix of the present invention is a hydrofluoroolefin or a hydrochlorofluoroolefin, alone or in a combination. Preferred hydrofluoroolefin (HFO) blowing agents contain 3, 4, 5, or 6 carbons, and include but are not limited to pentafluoropropenes; tetrafluoropropenes such as 1,3,3,3-tetrafluoropropene (HFO 1234ze, E and Z isomers), 2,3,3,3-tetrafluoropropene (HFO 1234yf), 1,2,3,3-tetrafluoropropene (HFO1234ye); trifluoropropenes such as 3,3,3-trifluoropropene (1243zf); tetrafluorobutenes such as HFO 1345; pentafluorobutene isomers such as HFO1354; hexafluorobutene isomers such as HFO1336 (e.g. z-1336mzz); heptafluorobutene isomers such as HFO1327; heptafluoropentene isomers such as HFO1447; octafluoropentene isomers such as HFO1438; nonafluoropentene isomers such as HFO1429; HCFOs such as 1-chloro-3,3,3-trifluoropropene (HCFO-1233zd), 2-chloro-3,3,3-trifluoropropene (HCFO-1233xf), HCFO1223, 1,2-dichloro-1,2-difluoroethene (E and Z isomers), 3,3-dichloro-3-fluoropropene, 2-chloro-1,1,1,4,4,4-hexafluorobutene-2 (E and Z isomers), 2-chloro-1,1,1,3,4,4,4-heptafluorobutene-2 (E and Z isomers). Particularly advantageous blowing agents in the pre-mixes of the present invention comprise unsaturated halogenated hydroolefins with normal boiling points less than about 60° C.

In one embodiment, the blowing agent comprises, consists essentially of, or consists of 1-chloro-3,3,3-trifluoropropene, E and/or Z HCFO-1233zd. A major or predominant portion of the HCFO-1233zd may be the trans isomer. For example, in various embodiments the weight ratio of trans and cis isomers of HFCO-1233zd present in the blowing agent used is 100:0 to 70:30; 100:0 to 90:10; or 100:0 to 97:3.

The halogenated hydroolefin blowing agents in the pre-mix of the present invention can be used alone or in combination with other blowing agents including but not limited to: (a) hydrofluorocarbons including but not limited to difluoromethane (HFC-32); 1,1,1,2,2-pentafluoroethane (HFC-125); 1,1,1-trifluoroethane (HFC143a); 1,1,2,2-tetrafluorothane (HFC-134); 1,1,1,2-tetrafluoroethane (HFC-134a); 1,1-difluoroethane (HFC-152a); 1,1,1,2,3,3,3-heptafluoropropane (HFC-227ea); 1,1,1,3,3-pentafluopropane (HFC-245fa); 1,1,1,3,3-pentafluobutane (HFC-365mfc) and 1,1,1,2,2,3,4,5,5,5-decafluoropentane (HFC-4310mee); (b) hydrocarbons including but not limited to, pentane isomers (iso-pentane, n-pentane, cyclo-pentane) and butane isomers; (c) hydrofluoroethers (HFE) such as, $C_4F_9OCH_3$ (HFE-7100), $C_4F_9OC_2H_5$ (HFE-7200), $CF_3CF_2OCH_3$ (HFE-245cb2), $CF_3CH_2CHF_2$ (HFE-245fa), $CF_3CH_2OCF_3$ (HFE-236fa), $C_3F_7OCH_3$ (HFE-7000), 2-trifluoromethyl-3-ethoxydodecofluorohexane (HFE-7500), 1,1,1,2,3-hexafluoro-4-(1,1,2,3,3,3-hexafluoropropoxy)-pentane (HFE-7600), 1,1,1,2,2,3,5,5,5-decafluoro-3-methoxy-4-(trifluoromethyl)pentane (HFE-7300), ethyl nonafluoroisobutyl ether/ethyl nonafluorobutyl ether (HFE-8200), $CHF_2OCHF_2$, $CHF_2OCH_2F$, $CH_2FOCH_2F$, $CH_2FOCH_3$, cyclo-$CF_2CH_2CF_2O$, cyclo-$CF_2CF_2CH_2O$, $CHF_2CF_2CHF_2$, $CF_3CF_2OCH_2F$, $CHF_2OCHFCF_3$, $CHF_2OCF_2CHF_2$, $CH_2FOCF_2CHF_2$, $CF_3OCF_2CH_3$, $CHF_2CHFOCHF_2$, $CF_3OCHFCH_2F$, $CF_3CHFOCH_2F$, $CF_3OCH_2CHF_2$, $CHF_2OCH_2CF_3$, $CH_2FCF_2OCH_2F$, $CHF_2OCF_2CH_3$, $CHF_2CF_2OCH_3$ (HFE254 pc), $CH_2FOCHFCH_2F$, $CHF_2CHFOCH_2F$, $CF_3OCHFCH_3$, $CF_3CHFOCH_3$, $CHF_2OCH_2CHF_2$, $CF_3OCH_2CH_2F$, $CF_3CH_2OCH_2F$, $CF_2HCF_2CF_2OCH_3$, $CF_3CHFCF_2OCH_3$, $CHF_2CF_2CF_2OCH_3$, $CHF_2CF_2CH_2OCH_2F$, $CF_3CF_2CH_2OCH_3$, $CHF_2CF_2OCH_2CH_3$, $(CF_3)_2CFOCH_3$, $(CF_3)_2CHOCHF_2$, $(CF_3)_2CHOCH_3$, and mixture thereof; (d) C1 to C5 alcohols, C1 to C4 aldehydes, C1 to C4 ketones, C1 to C4 ethers and diethers, C1 to C6 hydrocarbons, e.g. iso-, normal, cyclo-pentane; (e) water, (f) carbon dioxide;

(g) trans-1,2-dichloroethylene; and (h) methylformate, methylacetate, ethyl formate, and dimethoxymethane.

It has been found that the shelf stability of a pre-mix containing halogenated hydroolefin blowing agent may be significantly affected by the apparent pH of the polyol or polyols comprising the polyol component of the pre-mix. In particular, undesirably large increases in gel time and/or tack free time may be exhibited by a polyol pre-mix after being stored for a period of time, if the apparent pH of the polyol(s) is not controlled. For consistency and reproducibility in a foam manufacturing operation, it will be advantageous if the gel time and/or tack free time exhibited by a polyol pre-mix when combined with an organic polyisocyanate or other hydroxyl-reactive component to form a foam increase less than 40%, less than 25%, less than 15% or even less than 10% after the polyol pre-mix has been stored for six months at ambient temperature (e.g., 23° C.). As used herein, "gel time" means the time from the beginning of mixing to the point at which the first string forms using a standard tongue depressor to pull upward or resistance of foam forming is felt from under the foam surface. Typically, it will be desirable for the gel time of such systems to be relatively brief, e.g., 1 to 300 seconds. As used herein, "tack free time" means the time from the beginning of mixing to the point that the outer skin of the foam loses its stickiness.

As used herein, the term "apparent pH" means the pH of a polyol as measured in accordance with the following test method:

Reagents
  Isopropanol-water (10/6 v/v)-mix 10 parts of IPA (ACS Reagent grade, fresh bottle) and 6 parts of distilled water
  Hydrochloric acid, ~0.001N, aqueous
  Sodium hydroxide, ~0.001N, aqueous
  Buffer solutions, pH 7.0 and 4.0

Apparatus
  Expanded scale pH meter or equivalent
  Glass electrode, Corning #476022 or equivalent
  Calomel electrode, sleeve-type, Corning #476162 or equivalent
  Beaker, 100-mL graduated
  Magnetic stirrer with stirring bar
  Autodispenser, 50-mL Procedure
  1. Calibrate the pH meter with pH 4.0 and 7.0 buffers using the procedure recommended by the instrument manufacturer.
  2. Dispense 50 mL of IPA-water into a 100-mL beaker.
  3. Immerse the tips of the electrodes into the solvent to a depth not to exceed one-quarter inch above the sleeve of the reference electrode.
  4. Add a stirring bar and stir at ~200 rpm.
  5. Adjust the pH of the solvent to 7.00±0.01 with dilute sodium hydroxide or dilute hydrochloric acid added dropwise. Only adjust one way. Do not back adjust.
  6. Remove electrodes and weigh 10.0±0.1 g sample into the neutralized solvent.
  7. Stir until the sample is dissolved.
  8. Immerse the tips of the electrodes into the solution as in step 3. Adjust stirring as in step 4.
  9. Allow meter to stabilize. This may take several minutes.
  10. Read the pH to the nearest 0.01 pH unit.

This test method is also described in Carey et al., Apparent pH of Polyether Polyols—A Comparison of Methods, Polyurethanes 90, Proceedings of the SPI 33$^{rd}$ Annual Technical/Marketing Conference, pp. 289-296 (under the section heading "Standard IPA-Water Method").

To improve the shelf stability of a pre-mix containing at least one halogenated olefin blowing agent, each polyol present in the pre-mix should have an apparent pH of at least 3 but no greater than 11.4. In one embodiment, each polyol of the polyol component has an apparent pH of at least 4. In other embodiments, each polyol of the polyol component has an apparent pH no greater than 11, no greater than 10, or no greater than 9.

In embodiments of the invention in which the polyol pre-mix contains more than one polyol, the apparent pH of the blended polyols is advantageously at least 3 but no greater than 11.4. The blend of polyols in the pre-mix may, for example, have an apparent pH of at least 4 and/or an apparent pH no greater than 11, no greater than 10 or no greater than 9.

Although, generally speaking, any type of polyol or combination of different types of polyols may be utilized in the pre-mixes of the present invention (provided the apparent pH limitations set forth herein are met), in various embodiments of the invention the polyol or polyols is or are selected from the group consisting of polyether polyols, polyester polyols, polyether/ester polyols and combinations thereof.

The processes used to make each polyol may be varied or selected so as to directly provide polyol having the desired apparent pH characteristics. For example, the catalyst(s), initiator(s), and/or reactant(s)/monomer(s) employed and also the conditions under which a polyol is prepared and purified may be chosen so that the resulting polyol has an apparent pH within certain parameters, in accordance with the various embodiments of the invention. For example, if a highly basic catalyst is utilized to prepare a polyol, the polyol product may be treated with an adsorbent or neutralizing agent so as to remove or neutralize the residual basic catalyst, thereby lowering the apparent pH of the polyol. Alternatively or additionally, the apparent pH of an already-prepared polyol may be adjusted through the addition of an appropriate quantity of acid and/or base.

Polyether polyols are well known in the art and may, for example, be prepared by reacting an active hydrogen-containing initiator compound (or mixture of such compounds) with one or more alkylene oxides such as ethylene oxide and/or propylene oxide. Typically, base catalysis is employed for such purpose, with the base subsequently being removed or neutralized prior to use of the polyether polyol. Suitable initiator compounds can contain two or more active hydrogens per molecule, such as may be provided by hydroxyl (—OH) groups or primary or secondary amino (—NH$_2$ or —NHR) groups. The alkylene oxide(s) react with the initiator compound so as to add oxyalkylene groups onto the hydroxyl or amino groups, with additional alkylene oxide then reacting with the alkoxylated initiator compound to form polyether chains originating from what originally had been the position of the active hydrogen-containing functional group(s). Suitable initiator compounds may, in various embodiments of the invention, contain two to eight, two to seven or two to six active hydrogens per molecule, which will generally yield polyether polyols having functionalities corresponding approximately to the number of active hydrogens in the initiator compound. As used herein, the term "functionality" (e.g., as used to refer to a polyether polyol having a functionality of 3) means the average number of isocyanate-reactive functional groups (e.g., hydroxyl groups) per molecule. In certain embodiments of the invention, the polyol component is comprised of at least one polyol having a functionality greater than 2 or at least one polyol having a functionality of 3 or more. Examples of suitable initiator compounds include, but are not limited to, glycerin, trimethylolpropane, aminoalcohols such as ethanolamine, diethanolamine and triethanolamine, pentaerythritol, dipentaerythritol, α-methyl glucoside, xylitol, sugars (such as sucrose), sugar alcohols (such as sorbitol), mono- and oligomeric glycols such as ethylene glycol, propylene glycol, diethylene glycol, dipropylene glycol and the like, polyamines (such as ethylene diamine, toluene diamine, diethylene triamine, diaminodiphenylmethane and polymethylene polyphenylene diamine), aromatic amines, Mannich bases, Novolacs (phenol-formaldehyde resins), and combinations thereof (such as a mixture of sucrose and glycerin or a mixture of sorbitol and glycerin).

Ethylene oxide can be used in conjunction with propylene oxide to produce a variety of copolymer polyol structures: as an end-cap (or tip), or as a block in the polymer chain, or as a "random copolymer" formed by polymerizing ethylene oxide and propylene oxide together, as well as a combination of two or more of these types of structures. In certain embodiments of the invention, polyether polyols may be used which are ethylene oxide homopolymers, propylene oxide homopolymers, or ethylene oxide/propylene oxide copolymers (e.g., block, gradient, random, or other types of copolymers) wherein the weight ratio of EO:PO may be from 1:99 to 99:1.

For example, in various embodiments of the invention, a polyether polyol is used which is a propylene oxide/ethylene oxide copolymer containing two or more hydroxyl-terminated polyether chains extending from a residue of an initiator compound, wherein the polyether chains each contain an inner block and an outer block, wherein the inner block of each of said polyether chains has a molecular weight of from about 150 to 350 and contains from 10 to 35% by weight of oxypropylene units and from 65 to 90% by weight of oxyethylene units, and the outer block of each of said polyether chains contains from 95 to 100% by weight oxypropylene units and from 0 to 5% by weight oxyethylene units, and further wherein the propylene oxide/ethylene oxide copolymer has a hydroxyl equivalent weight of from 800 to 2000 and a total oxyethylene content of from 5 to 18% by weight. Such polyether polyols are described, for example, in U.S. Pat. No. 9,156,936.

The number average molecular weight of the polyether polyol(s) may be, in various desirable embodiments of the invention, in the range of 250 to 6500 Daltons. A plurality of polyether polyols having different number average molecular weights may be utilized. Advantageously, the viscosity of each polyether polyol may be in the range of 400 to 21,000 cps at 25° C.

The hydroxyl number of the polyether polyol(s) useful in the present invention may vary significantly and may be selected in accordance with the desired properties of the thermoset obtained by reacting the polyols with organic polyisocyanate or the like. For example, the polyether polyols may have hydroxyl numbers of from 200 to 850 mg KOH/g. Mixtures of polyether polyols with different hydroxyl numbers may be used.

Examples of polyether polyols suitable for use in the present invention include, without limitation (provided that they meet the previously discussed apparent pH requirements of the present invention):

Sucrose/glycerin-initiated polyether polyols having hydroxyl numbers of 300 to 600 mg KOH/g and functionalities of 4 to 7.

Mannich-base initiated polyether polyols having hydroxyl numbers of from 400 to 500 mg KOH/g and functionalities of 3.1 to 3.8.

Aliphatic amine-initiated polyether polyols having hydroxyl numbers of from 500 to 850 mg KOH/g and functionalities of from 3 to 4.

Sucrose/diethylene glycol-initiated polyether polyols having hydroxyl numbers of from 390 to 490 mg KOH/g and functionalities of from 4 to 4.7.

Sorbitol-initiated polyether polyols having hydroxyl numbers of from 440 to 540 mg KOH/g and functionalities of from 4.4 to 5.8.

Sucrose/amine-initiated polyether polyols having hydroxyl numbers of from 440 to 550 mg KOH/g and functionalities of from 4 to 7.

Aromatic amine-initiated polyether polyols having hydroxyl numbers of from 275 to 550 mg KOH/g and functionalities of 3.2 to 4.0. Ortho-toluene diamine (TDA) and diphenylmethanediamine (MDA) are examples of aromatic amines.

Examples of commercially available polyether polyols include, but are not limited to, products sold under the following trade names: Jeffol SG-360 (sold by Huntsman), Voranol 490 (sold by Dow Chemical), Jeffol R-470X (sold by Huntsman), Jeffol R-425X (sold by Huntsman), Jeffol AD-310 (sold by Huntsman), Jeffol AD-500 (sold by Huntsman), Jeffol SD-441 (sold by Huntsman), Jeffol S-490 (sold by Huntsman), Jeffol SA-499 (sold by Huntsman), Pluracol 1578 (sold by BASF) and Carpol EDAP 800 (sold by Carpenter Chemicals).

Prior to use in accordance with the present invention, however, the apparent pH of any commercially-obtained polyether polyol should be checked using the analytical method described herein to confirm that the polyether polyol has an apparent pH within the desired range. Performing such a check on each batch or lot of polyether polyol is advisable, as some variability in apparent pH may be observed from batch-to-batch or lot-to-lot or as a particular batch or lot of polyether polyol ages. If the apparent pH is found to be outside the desired range, it may be adjusted by combining the polyether polyol with an amount of one or more pH adjusting agents (e.g., acids, bases) which is effective to bring the apparent pH within such desired range, as described elsewhere herein.

Polyester polyols are characterized by having polyester-containing chains and hydroxyl end groups. They are typically produced by polycondensation of a polyacid (e.g., a diacid) with excess polyalcohol (e.g., diol). The polycondensation may be carried out in the presence of a catalyst, such as a metal-containing catalyst. To produce polyester polyols with branched structures and/or functionalities greater than 2, some amount of polyacid containing more than two acid groups per molecule and/or polyalcohol containing more than two hydroxyl groups per molecule may be employed. While any type of polyester polyol may be utilized in the present invention, the use of aromatic polyester polyols may be especially advantageous. Aromatic polyester polyols may be prepared, for example, by utilizing aromatic polyacids as reactants (e.g., phthalic acids). In certain embodiments of the invention, one or more aromatic polyester polyols are employed having hydroxyl numbers of 200 to 450 mg KOH/g and functionalities of 2 to 3. In addition to having apparent pH values in accordance with the previously discussed requirement, it will generally be advantageous to select polyester polyols having relatively low levels of certain Lewis acid catalysts (e.g., Sb, Ti and Mn-containing catalysts), which are sometimes employed in the manufacture of such polyols but which tend to decrease the stability of the pre-mix. In particular, the polyester polyol(s) employed should desirably contain less than 60 ppm Sb, more preferably less than 40 ppm Sb and most preferably less than 20 ppm Sb, less than 150 ppm Ti, more preferably less than 120 ppm Ti and most preferably less than 75 ppm Ti, and less than 6000 ppm Mn, more preferably less than 4000 ppm Mn and most preferably less than 2000 ppm Mn.

Examples of commercially available polyester polyols include, but are not limited to, products sold under the following trade names: Terate 3510 (sold by Invista), Terate HT 5100 (sold by Invista), Terate 2031 (sold by Invista), Terol XO 12009 (sold by Huntsman), Terol 305 (sold by Huntsman), Stepanpol PS 2520 (sold by the Stepan Company), Stepanpol PS 3021 (sold by the Stepan Company), Stepanpol PS 3422 (sold by the Stepan Company), Stepanpol PS 3524 (sold by the Stepan Company), and Stepanpol PS 2352 (sold by the Stepan Company).

Prior to use in accordance with the present invention, however, the apparent pH of any commercially-obtained polyester polyol should be checked using the analytical method described herein to confirm that the polyester polyol has an apparent pH within the desired range. Performing such a check on each batch or lot of polyester polyol is advisable, as some variability in apparent pH may be observed from batch-to-batch or lot-to-lot or as a particular batch or lot of polyester polyol ages. If the apparent pH is found to be outside the desired range, it may be adjusted by combining the polyester polyol with an amount of one or more pH adjusting agents (e.g., acids, bases) which is effective to bring the apparent pH within such desired range, as described elsewhere herein.

Polyether/ester polyols are polyols that contain both oxyalkylene and ester-containing repeating units. Exemplary suitable polyether/ester polyols include aromatic polyether/ester polyols having hydroxyl numbers of from 275 to 575 mg KOH/g and functionalities of from 2.8 to 3.5.

In preparing rigid foam, it is preferred that the amount of polyester polyol is in the range of 0 to 100 parts per 100 parts of total polyols (pphp) and the amount of polyether polyol is in the range of 100 to 0 pphp; it is more preferable that the amount of polyester polyol is the range of 10 to 90 pphp and the amount of polyether polyol is in the range of 90 to 10 pphp; Even more preferably, the amount of polyester polyol is in the range of 20 to 80 pphp and the amount of polyether polyol is in the range of 80 to 20 pphp. A single polyester polyol or a blend of two or more different polyester polyols can be utilized, as previously described. Likewise, a single polyether polyol or a blend of two or more different polyether polyols may be employed. The polyol component may be a combination of one, two or more polyester polyols and one, two or more polyether polyols.

In embodiments of the invention in which the pre-mix is comprised of two or more different polyols, the impact of the apparent pH of an individual polyol on the gel time and stability of the pre-mix may, generally speaking, be affected by the apparent pH value as well as the relative amount of that polyol in the pre-mix. For example, when the apparent pH of a polyol is around 10 and the apparent pH of the other polyol(s) present in a pre-mix is about neutral (ca. 7), the gel time and stability characteristics of the pre-mix will typically be increasingly affected in an adverse way as the proportion of the high apparent pH polyol is increased relative to the amount of the other polyol(s).

To further illustrate the foregoing, the following table provides preferred and more preferred maximum amounts of polyether polyol or polyether/ester polyol having a given apparent pH value that may be blended with a polyester polyol (apparent pH=ca. 4-5) to provide a polyol pre-mix containing halogenated hydroolefin blowing agent having acceptable storage stability.

| Apparent pH of Polyether or Polyether/ester Polyol | Preferred Amount of Polyether or Polyether/ester Polyol, pbw per 100 pbw Total Polyol in Pre-Mix | More Preferred Amount of Polyether or Polyether/ester Polyol, pbw per 100 pbw Total Polyol in Pre-Mix |
| --- | --- | --- |
| 7 to 8 | Up to 100 | Not more than 70 |
| Greater than 8 to 9 | Not more than 80 | Not more than 40 |
| Greater than 9 to 10 | Not more than 60 | Not more than 30 |
| Greater than 10 to 11.4 | Not more than 45 | Not more than 25 |

If the apparent pH of a polyol is measured and found to be outside of the range which has been discovered to be advantageous for purposes of maintaining the stability of a pre-mix in accordance with the present invention, the apparent pH of that polyol may be adjusted by the addition of an amount of an acid or base effective to bring the apparent pH within the desired range. In particular, if the apparent pH of a polyol is found to be too basic (e.g., in excess of a value of 11.4 or 11 or 10 or 9) such that the storage stability of the resulting pre-mix is adversely affected to a significant degree, sufficient acid may be combined with the polyol to provide a polyol having a target pH value. A $H^+$ containing compound such as an organic acid, inorganic acid, or combination of organic acid and inorganic acid may be utilized to reduce the apparent pH of a polyol to desired level. Organic acids such as a C1 to C15 carboxylic acid or ester containing at least one carboxyl functional group (—COOH) are especially suitable for such purpose, in particular aliphatic organic acids such as octanoic acid, malonic acid and carboxylic esters such as methyl hydrogen malonate and ethyl hydrogen malonate. Different organic acids and/or different inorganic acids may be used together in combination, if so desired.

In other embodiments of the invention, the process conditions employed in manufacturing the polyol are selected or controlled so as to directly provide a polyol having the desired apparent pH value or having an apparent pH falling within a desired or preferred range. For example, the type of catalyst utilized in synthesizing a polyol may impact the apparent pH of the polyol. The use of a highly acidic catalyst or highly basic catalyst (e.g., KOH, CsOH) may, for instance, cause the apparent pH of the resulting polyol to be outside the apparent pH range deemed desirable in order to impart acceptable storage stability to a pre-mix containing such polyol. Such a polyol may be further processed to remove such a catalyst, reduce the content of such a catalyst and/or at least partially neutralize such catalyst, thereby adjusting the apparent pH to a value conducive to achieving satisfactory pre-mix stability. Alternatively, a catalyst which is neither highly basic or highly acidic may be used to prepare the polyol; examples of such a catalyst may include double metal cyanide catalysts, which optionally comprise at least one ionic surface or interface active compound selecting from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) salts.

The pre-mixes of the present invention are capable of forming foams having a generally cellular structure, in particular after being combined with components (such as organic polyisocyanates) reactive with the hydroxyl groups of the polyols to thereby form a thermoset. Examples of thermosetting compositions which may be prepared using the pre-mixes of the present invention include polyurethane and polyisocyanurate foam compositions, and also phenolic foam compositions, preferably low-density foams, flexible or rigid.

The invention also relates to foam, and preferably closed cell foam, prepared from a pre-mix in accordance with the description provided herein. The closed cell content that is measured according to ASTM D 2856, or ISO 4590, or a method equivalent to the two methods mentioned, is typically greater than 80%, preferably greater than 90%. The thermal conductivity of the foam, which is characterized as R value per inch, is typically greater than 5, preferably greater than 5.5. In some cases of foam application, fire performance is a key safety factor. Fire performance is characterized by flame spread and smoke developed. Typically, the less flame spread or smoke developed, the better fire performance of the foam. Flame spread of 200 or less is typically required, flame spread of 75 or less is preferred, and flame spread of 25 or less is even more preferred. A smoke developed value of less than 450 is always preferred.

The invention also relates to foam prepared from a pre-mix in accordance with the description provided herein. Cell gas analysis of the foam showed that lower levels of degraded products were present in the cell after the foam was made, as compared to the levels of such degraded products present in foams prepared from halogenated hydroolefin blowing agent-containing premixes not in accordance with the present invention. As used herein, "degraded products" refers to the organic compounds present within the cells of the foam other than the blowing agent(s) and impurities coming with the blowing(s) constituents of the blowing agent(s) which were used to prepare the foam. Accordingly, "degraded products" are the volatile by-products generated. The levels of degraded products such as silanes, e.g., dimethyldifluorosilane, and trimethylfluorosilane; siloxanes, e.g., hexamethyldisiloxane, are preferably no more than 20,000 ppm, more preferably no more than 10,000 ppm, and even more preferably no more than 5,000 ppm, and even more preferably no more than 2,000 ppm; and even more preferably no more than 1,000 ppm; even more preferably no more than 500 ppm; even more preferably no more than 250 ppm; even more preferably no more than 130 ppm, most preferably no more than 65 ppm. Such concentrations are based on the total amount of organic compounds measured in the cell gas of a foam (i.e., X parts by weight total degraded products per million parts by weight total organic compounds). The cell gas analysis was performed on a foam according to the procedures described hereafter.

A gas chromatography (GC) method is used to determine the weight percent ratio of all organic components that can be detected using Flame Ionization Detector (FID) in foam samples using a capillary gas chromatography apparatus, which was calibrated according to the procedure known to people skillful in art. The following table describes the method used:

| GC: Agilent 6890 |
|---|
| Column Type: Restek RTX-1301 |

Column Length: 105 meters
Column ID: 0.25 mm
Film Thickness: 1 μm

| GC: Agilent 6890 |
|---|
| Temperature program |
| Initial Temp: 30° C. |
| Initial Time: 15 min |
| Rate A: 10° C./min |
| Temperature A: 100° C. |
| Time A: 1.0 min |
| Rate B: 30° C./min |
| Temperature B: 250° C. |
| Time B: 15.0 min |
| Total Time: 43 min |
| Type: Helium |
| Head Pressure: 35 psi |
| (constant pressure) |
| Column Flow: 1.4 mL/min |
| Column Velocity: 20 cm/sec |
| Injection Port |
| Type: Split/Splitless |
| Temperature: 200° C. |
| Split: 25:1 |
| Injection Volume: 0.5 cc |
| Detector |
| Type: FID |
| Temperature: 250° C. |

The foam sample is cored using a #5 cork bore, and then pushed out of the bore with a glass stirring-rod into a syringe. Use a length of foam to fill approximately 0.5 cc of a 10 cc gas tight syringe. Quickly depress foam while the syringe is in the GC injection port then start GC.

In certain embodiments of the invention, the B-side polyol pre-mix can include (in addition to the previously described blowing agent(s) and polyol(s)) silicone or non-silicone based surfactants, amine or non-amine based catalysts, flame retardants/suppressors, acid scavengers, radical scavengers, fillers, and other necessary or desirable stabilizers/inhibitors as well as other additives conventional in the thermoset foam art.

Exemplary catalysts include, but are not limited to: N,N-dimethylethanolamine (DMEA), N,N-dimethylcyclohexylamine (DMCHA), bis(N,N-dimethylaminoethyl)ether (BDMAFE), N,N,N',N',N"-pentamethyldiethylenetriamine (PDMAFE), 1,4-diazadicyclo[2,2,2]octane (DABCO), 2-(2-dimethylaminoethoxy)-ethanol (DMAFE), 2-((2-dimethylaminoethoxy)-ethyl methyl-amino)ethanol, 1-(bis(3-dimethylamino)-propyl)amino-2-propanol, N,N',N"-tris(3-dimethylamino-propyl)hexahydrotriazine, dimorpholinodiethylether (DMDEE), N.N-dimethylbenzylamine, N,N,N',N",N"-pentaamethyldipropylenetriamine, N,N'-diethylpiperazine. In particular, sterically hindered primary, secondary or tertiary amines are useful, for example, dicyclohexylmethylamine, ethyldiisopropylamine, dimethylcyclohexylamine, dimethylisopropylamine, methylisopropylbenzylamine, methylcyclopentylbenzylamine, isopropyl-sec-butyl-trifluoroethylamine, diethyl-α-phenyethyl)amine, tri-n-propylamine, dicyclohexylamine, t-butylisopropylamine, di-t-butylamine, cyclohexyl-t-butylamine, de-sec-butylamine, dicyclopentylamine, di-α-trifluoromethylethyl)amine, di-(α-phenylethyl)amine, triphenylmethylamine, and 1,1,-diethyl-n-propylamine. Other sterically hindered amines include morpholines, imidazoles, ether containing compounds such as dimorpholinodiethylether, N-ethylmorpholine, N-methylmorpholine, bis(dimethylaminoethyl)ether, imidazole, n-methylimidazole, 1,2-dimethylimidazole, dimorpholinodimethylether, N,N,N',N',N",N"-pentamethyldiethylenetriamine, N,N,N',N',N",N"-pentaethyldiethylenetriamine, N,N,N',N',N",N"-pentamethyldipropylenetriamine, bis(diethylaminoethyl)ether, bis(dimethylaminopropyl)ether, guanidines including pentamethyl guanidine and cyclic guanidines, guanidine derivatives/salts including cyanoguanidine, guanidine hydrochloride salt, guanidine phosphate salts, guanidine sulfate salts, 1-acetylguanidine, nitroguanidine, 1-(o-tolyl) biguanidine, and mixtures thereof, as well as tetraalkyl guanidines that have a formula as in the following:

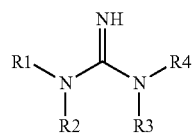

where R1, R2, R3, and R4 are independently C1-C10 alkyl groups; exemplary tetraalkyl guanidines include tetramethyl guanidine, PolyCat 201, 204 (Air Products and Chemicals) and the like; and combinations thereof.

Exemplary non-amine catalysts include organometallic compounds containing bismuth, lead, tin, cadmium, cobalt, iron, thorium, aluminum, mercury, zinc, nickel, cerium, molybdenum, vanadium, copper, zirconium, magnesium, calcium, sodium, potassium, lithium or combination thereof such as stannous octoate, dibutyltin dilaurate (DGTDL), dibutyltin mercaptide, phenylmercuric propionate, lead octoate, potassium acetate/octoate, magnesium acetate, titanyl oxalate, potassium titanyl oxalate, quaternary ammonium formates, ferric acetylacetonate and combination thereof.

The use level of catalyst is typically in an amount of from about 0.1 ppm to about 6.00 wt % of the polyol pre-mix, for example from about 0.5 ppm to 5 wt % or from about 1 ppm to 4 wt %.

Exemplary surfactants include, but are not limited to, polysiloxane polyoxyalkylene block co-polymers such as B8404, B8407, B8409, B8462 and B8465 available from Goldschmidt; DC-193, DC-197, DC-5582, and DC-5598 available from Air Products; and L-5130, L5180, L-5340, L-5440, L-6100, L-6900, L-6980, and L6988 available from Momentive. Exemplary non-silicone surfactants include salts of sulfonic acid, alkali metal salts of fatty acid, ammonium salts of fatty acid, oleic acid, stearic acid, dodecylbenzenedisulfonic acid, dinaphthylmethanedisulfonic acid, ricinoleic acid, an oxyethylated alkylphenol, an oxyethylated fatty alcohol, a paraffin oil, a castor oil ester, a ricinoleic acid ester, Turkey red oil, groundnut oil, a paraffin fatty alcohol, or combination thereof. Typically, use levels of surfactants are from about 0.1 to about 6 wt % of the polyol pre-mix, for example from about 0.2 to about 4.5 wt % or from about 0.4 to about 3 wt %.

Exemplary flame retardants include trichloropropyl phosphate (TCPP), triethyl phosphate (TEP), diethyl ethyl phosphate (DEEP), diethyl bis(2-hydroxyethyl)amino methyl phosphonate, brominated anhydride based ester, dibromoneopentyl glycol, brominated polyether polyol, melamine, ammonium polyphosphate, aluminum trihydrate (ATH), tris (1,3-dichloroisopropyl)phosphate, tri)-2-chloroethyl)phosphate, tri(2-chloroisopropyl)phosphate, chloroalkyl phosphate/oligomeric phosphonate, oligomeric chloroalkyl phosphate, brominated flame retardant based on pentabromo diphenyl ether, dimethyl methyl phosphonate, diethyl N,N bis(2-hydroxyethyl)amino methyl phosphonate, oligomeric phosphonate, and derivatives thereof.

In certain embodiments, acid scavengers, radical scavengers, and/or other types of stabilizers/inhibitors are included in the pre-mix. Exemplary stabilizer/inhibitors include epoxides such as 1,2-epoxy butane, glycidyl methyl ether and dl-limonene oxide; cyclic-terpenes such as dl-limonene, 1-limonene and d-limonene; nitromethane; diethylhydroxyl amine; alpha methylstyrene; isoprene; p-methoxyphenol; m-methoxyphenol; hydrazines; 2,6-di-t-butyl phenol; hydroquinone; organic acids such as carboxylic acid, dicarboxylic acid, phosphonic acid, sulfonic acid, sulfamic acid, hydroxamic acid, formic acid, acetic acid, propionic acid, butyric acid, caproic acid, isocaprotic acid, 2-ethylhexanoic acid, caprylic acid, cyanoacetic acid, pyruvic acid, benzoic acid, oxalic acid, malonic acid, succinic acid, adipic acid, azelaic acid, trifluoroacetic acid, methanesulfonic acid, or benzenesulfonic acid; esters, including esters of the aforementioned acids, such as methyl formate, ethyl formate, methyl acetate, isopropyl formate, isobutyl formate, isoamyl formate, methyl benzoate, benzyl formate or ethyl acetate; and combinations thereof. Other additives such as adhesion promoters, anti-static agents, antioxidants, fillers, hydrolysis agents, lubricants, anti-microbial agents, pigments, viscosity modifiers, UV resistance agents may also be included in the pre-mix. Examples of these additives include: sterically hindered phenols; diphenylamines; benzofuranone derivatives; butylated hydroxytoluene (BHT); calcium carbonate; barium sulphate; glass fibers; carbon fibers; micro-spheres; silicas; melamine; carbon black; waxes and soaps; organometallic derivatives of antimony, copper, and arsenic; titanium dioxide; chromium oxide; iron oxide; glycol ethers; dimethyl AGS esters; propylene carbonate; and benzophenone and benzotriazole compounds.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol pre-mix composition, and other materials such as optional flame retardants, colorants, or other additives. These foams can be rigid, flexible, or semi-rigid, and can have a closed cell structure, an open cell structure or a mixture of open and closed cells.

It is convenient in many applications to provide the components for polyurethane or polyisocyanurate foams in pre-blended formulations. Most typically, the foam formulation is pre-blended into two components. The isocyanate and optionally other isocyanate compatible raw materials comprise the first component, commonly referred to as the "A-" side component. The polyol mixture composition, including polyol, surfactant, catalysts, blowing agents, and optional other ingredients comprise the second component, commonly referred to as the "B-" side component. In any given application, the "B-" side component may not contain all the above listed components, for example some formulations omit the flame retardant if that characteristic is not a required foam property. Accordingly, polyurethane or polyisocyanurate foams are readily prepared by bringing together the A- and B-side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a stream to the mix head or reaction site. Most conveniently, however, they are all incorporated into one B-side component as described above. Optionally, one or more non-water-containing B-side components can be added into the A-side. In some circumstances, A and B can be formulated and mixed into one component in which water is removed. This is typical, for example, for a spray-foam canister containing a one-component foam mixture for easy application.

A foamable composition suitable for forming a polyurethane or polyisocyanurate foam may be formed by reacting an organic polyisocyanate and the polyol pre-mix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry.

Representative organic polyisocyanates correspond to the formula:

$$R(NCO)_z$$

wherein R is a polyvalent organic radical which is either aliphatic, aralkyl, aromatic or mixtures thereof, and z is an integer which corresponds to the valence of R and is at least two. Representative examples of the organic polyisocyanates contemplated herein include, without limitation, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate (MDI), which can exist as different isomers such as 2,2'-MDI, 2,4'-MDI, and 4,4'-MDI, with the 4,4' isomer being most widely used; crude methylene diphenyl diisocyanate and the like; the aromatic triisocyanates such as 4,4',4''-triphenylmethane triisocyanate, 2,4,6-toluene triisocyanates; the aromatic tetraisocyanates such as 4,4'-dimethyldiphenylmethane-2,2',5,5'-tetraisocyanate, and the like; arylalkyl polyisocyanates such as xylylene diisocyanate; aliphatic polyisocyanates such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene disocyanate, polymethylene polyphenyl isocyanate, 2,4- and 2,6-toluenediisocyanate, dianisidine diisocyanate, bitolylene isocyanate, naphthylene 1,4-diisocyanate, bis(4-isocyanatophenyl)methene, bis(2-methyl-4-isocyanatophenyl)methane, and the like. In one particular embodiment of the invention, polymethylene polyphenyl isocyanates are employed, particularly the mixtures containing from about 30 to about 85 percent by weight of methylenebis(phenyl isocyanate) with the remainder of the mixture comprising the polymethylene polyphenyl polyisocyanates of functionality higher than 2. These polyisocyanates are prepared by conventional methods known in the art. In the present invention, the organic polyisocyanate and the polyol may be employed in amounts which will yield an NCO/OH stoichiometric ratio in a range of from about 0.9 to about 5.0. In the present invention, the NCO/OH equivalent ratio may be about 1.00 or more and about 3.50 or less, e.g., from about 1.05 to about 3.00. Especially suitable organic polyisocyanates include polymethylene polyphenyl isocyanate, methylenebis(phenyl isocyanate), toluene diisocyanates, or combinations thereof.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art, including, but not limited to, glycine salts, tertiary amine trimerization catalysts, quaternary ammonium carboxylates, and alkali metal carboxylic acid salts and mixtures of the various types of catalysts. Preferred species within the classes are potassium acetate, potassium octoate, and sodium N-(2-hydroxy-5-nonylphenol)methyl-N-methylglycinate.

The polyurethane or polyisocyanurate foams produced using the pre-mixes of the present invention in combination with one or more organic polyisocyanates can vary in density from about 0.5 pounds per cubic foot to about 60 pounds per cubic foot, preferably from about 1.0 to 20.0 pounds per cubic foot, and most preferably from about 1.3 to 6.0 pounds per cubic foot. The density obtained is a function of how much of the halogenated olefin blowing agent or blowing agent mixture plus the amount of auxiliary blowing agent, such as water or other co-blowing agents, if any, is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well-known applications, including but not limited to thermal insulation, cushioning, flotation, packaging, adhesives, void filling, crafts and decorative, and shock absorption.

Aspects of the Invention Include:
1. A polyol pre-mix comprising:
   a) at least one blowing agent, including at least one halogenated hydroolefin blowing agent; and
   b) a polyol component comprised of at least one polyol; wherein each polyol of the polyol component has an apparent pH of at least 3 but no greater than 11.4.
2. The polyol pre-mix of aspect 1, wherein each polyol of the polyol component has an apparent pH of at least 4 but no greater than 11.
3. The polyol pre-mix of aspect 1, wherein each polyol of the polyol component has an apparent pH of at least 4 but no greater than 10.
4. The polyol pre-mix of aspect 1, wherein each polyol of the polyol component has an apparent pH of at least 4 but no greater than 9.
5. The polyol pre-mix of any one of aspects 1-4, wherein the polyol component is comprised of one more polyols selected from the group consisting of polyether polyols, polyester polyols, polyether/ester polyols and combinations thereof.
6. The polyol pre-mix of any one of aspects 1-5, wherein the polyol component is comprised of one or more polyols having functionalities of from 2 to 7.
7. The polyol pre-mix of any one of aspects 1-6, wherein the polyol component is comprised of at least one polyether polyol and at least one polyester polyol.

8. The polyol pre-mix of any one of aspects 1-6, wherein the polyol component contains 0 to 100 parts by weight polyester polyol per 100 parts by weight total polyol component and 100 to 0 parts by weight polyether polyol per 100 parts by weight total polyol component.

9. The polyol pre-mix of any one of aspects 1-7, wherein the polyol component contains 10 to 90 parts by weight polyester polyol per 100 parts by weight total polyol component and 90 to 10 parts by weight polyether polyol per 100 parts by weight total polyol component.

10. The polyol pre-mix of any one of aspects 1-7, wherein the polyol component contains 20 to 80 parts by weight polyester polyol per 100 parts by weight total polyol component and 80 to 20 parts by weight polyether polyol per 100 parts by weight total polyol component.

11. The polyol pre-mix of any one of aspects 1-7, 9 or 10, wherein the polyol component is comprised of at least one polyether polyol and at least one aromatic polyester polyol.

12. The polyol pre-mix of any one of aspects 1-11, wherein each polyol of the polyol component has a viscosity of from 400 to 60,000 cps at 25° C.

13. The polyol pre-mix of any one of aspects 1-12, wherein each polyol of the polyol component has a number average molecular weight of from 250 to 6500 Daltons.

14. The polyol pre-mix of any one of aspects 1-13, wherein the at least one halogenated hydroolefin blowing agent is selected from the group consisting of hydrofluoroolefins, hydrochlorofluoroolefins, and combinations thereof.

15. The polyol pre-mix of any one of aspects 1-14, wherein the at least one halogenated hydroolefin blowing agent includes HFCO-1233zd.

16. The polyol pre-mix of any one of aspects 1-15, additionally comprising at least one surfactant.

17. The polyol pre-mix of any one of aspects 1-15, additionally comprising at least one catalyst.

18. The polyol pre-mix of any one of aspects 1-15, additionally comprising at least one surfactant and at least one catalyst.

19. A polyurethane or polyisocyanurate foam which is the reaction product of a polyol pre-mix in accordance with any one of aspects 1-18 and at least one organic polyisocyanate.

20. A method of making a polyurethane or polyisocyanurate foam, comprising reacting a polyol pre-mix in accordance with any one of aspects 1-18 and at least one organic polyisocyanate.

21. The method of aspect 20, wherein the polyol pre-mix is prepared by blending the at least one blowing agent and the polyol component and aging the resulting polyol pre-mix for at least one month at ambient temperature prior to reacting the polyol pre-mix with the at least one organic polyisocyanate.

22. A method of making a polyol pre-mix having improved shelf life, comprising selecting a polyol or plurality of polyols, measuring the apparent pH of each polyol, confirming that the measured apparent pH of each polyol is within the range of 3 to 11.4, and combining the polyol or plurality of polyols with at least one blowing agent, including at least one halogenated hydroolefin blowing agent, to form the polyol pre-mix.

23. The method of aspect 22, comprising an additional step of adjusting the apparent pH of at least one polyol prior to combining the polyol or plurality of polyols with the at least one halogenated hydroolefin blowing agent.

24. The method of aspect 23, wherein the adjusting of the apparent pH is carried out by combining the polyol with at least one C1 to C15 carboxylic acid or ester containing at least one carboxyl functional group (—COOH).

Within this specification embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1 pH Measurement pH measurement was carried out at ambient temperature using a Metrohm 751 GDP Titrino titrator and an Unitrode Pt1000 (Metrohm part number: 6.0258.000, which is equivalent to Corning #476022) equipped with the temperature compensation function. Standard pH buffer solutions of 4, 7, and 10 purchased from Sigma-Aldrich Co. were used. The calibration was performed daily using the three standard buffer solutions. The slope according to the manufacturer's instruction should be within 0.95 to 1.05; the typical slope obtained is about 0.99 or 1.00. In order to measure apparent pH of a polyol, the procedure of IPA-water method that was described previously was followed. A master batch of isopropanol (HPLC grade purchased from Fischer Scientific) and deionized water solution was prepared using 10 volume parts of isopropanol and 6 volume parts of deionized water. 50 ml of IPA-water solution was dispensed with a 50 ml auto dispenser, and is about 44.4 g. The pH of the 50 ml IPA-water solution was measured first before adding a polyol, and if the pH was not about 7.00, 0.001 N hydrochloric acid or sodium hydroxide was added to adjust the pH to about 7.00. With a magnetic stirrer turned on and when the pH was stable around 7.00, the electrode was removed and about 10 g of a polyol was added into the solution and stirred for about 30 minutes; the electrode was replaced in the solution and allowed to stabilize, and the pH read three times to the nearest 0.01 pH unit. After the measurement, the electrode was removed from the solution and cleaned/maintained using a typical cleaning procedure.

The apparent pH values of 9 polyester polyols and 15 polyether polyols were measured according to the above procedures; the results are summarized in Table 1.

TABLE 1

Apparent pH of various polyols

| | Polyol | OH # | Functionality | Viscosity cps@25° C. | Apparent pH |
|---|---|---|---|---|---|
| 1 | Polyester #1 | 280-305 | 2.2-2.4 | 6000-10000 | 4.74 |
| 2 | Polyester #2 | 290-310 | 2.1-2.3 | 5000-6000 | 4.90 |
| 3 | Polyester #3 | 365-385 | 2.9-3.1 | 5500-7500 | 4.78 |
| 4 | Polyester #4 | 290-310 | 2.1-2.3 | 5000-6000 | 4.76 |
| 5 | Polyester #5 | 240-260 | 2.0-2.1 | 6000-8000 | 4.64 |
| 6 | Polyester #6 | 290-310 | 2.0-2.2 | 6000-8000 | 4.52 |

TABLE 1-continued

Apparent pH of various polyols

| | Polyol | OH # | Functionality | Viscosity cps@25° C. | Apparent pH |
|---|---|---|---|---|---|
| 7 | Polyester #7 | 340-360 | 2.1-2.3 | 6500-8500 | 4.73 |
| 8 | Polyester #8 | 340-360 | 2.3-2.5 | 7000-9000 | 4.41 |
| 9 | Polyester #9 | 230-250 | 2.0-2.1 | 2500-3500 | 4.71 |
| 10 | Polyether #1 | 460-480 | 3.2-3.4 | 8000-8400 | 10.21 |
| 11 | Polyether #2 | 415-435 | 3.1-3.3 | 4400-4600 | 10.55 |
| 12 | Polyether #3 | 300-320 | 3.1-3.3 | 2300-2500 | 7.36 |
| 13 | Polyether #4 | 490-510 | 3.1-3.3 | 17000-19000 | 7.26 |
| 14 | Polyether #5 | 430-450 | 4.2-4.4 | 5000-6000 | 7.34 |
| 15 | Polyether #6 | 480-500 | 4.6-4.8 | 8000-10000 | 7.30 |
| 16 | Polyether #7 | 485-505 | 4.2-4.4 | 6000-7000 | 10.05 |
| 17 | Polyether #8 | 350-370 | 4.6-4.8 | 3000-4000 | 8.59 |
| 18 | Polyether #9 | 470-515 | 4.0-5.0 | 5000-7100 | 9.58 |
| 19 | Polyether #10 | 375-415 | 4.0-4.2 | 17000-20000 | 10.23 |
| 20 | Polyether #11 | 740-825 | 4.0-4.1 | 15000-17000 | 11.56 |
| 21 | Polyether #12 | 610-655 | 3.0-3.2 | 450-490 | 10.68 |
| 22 | Polyether #13 | 335-375 | 4.5-4.7 | 900-1300 | 6.00 |
| 23 | Polyether #14 | 295-455 | 4.5-4.7 | 2050-3010 | 6.79 |
| 24 | Polyether #15 | 295-355 | 3.0-3.3 | 4400-4600 | 7.39 |
| 25 | Polyether #16 | 445-555 | 3.0-3.3 | 850-1050 | 7.47 |

Example 2

In the following examples, foams were made by a hand mix method which is known to people skillful in the art. B-side mixtures were pre-blended and then charged into containers that are suitable for pressure up to 100 psig. Blowing agents were then added into the B-side container and mixed thoroughly. The B-side containers were then placed in an oven that had its temperature controlled at about 50° C. (122° F.). The A-side (MDI) and B-side (mixture of the polyol, surfactant, catalysts, blowing agent, and additives) were mixed with a hand mixer and dispensed into a container to form a free rise foam after storing in a shaker in which the temperature was kept at about 15.6° C. (60° F.). The formulations tested (all had an Iso Index of 110) each contained Rubinate® M, a polymeric methylene diphenyl diisocyanate (MDI) available from Huntsman. All polyols were commercially available with desired properties. Tegostab® B 8486 is a surfactant available from Evonik-Degussa. PolyCat® 204 and Dabco® T-120 are catalysts from Air Products and Chemicals. TCPP is a flame retardant from ICL-IP America Inc. Total blowing agent level was 21.6 mls/g. Table 2 summarizes the formulations used for the study.

TABLE 2

Formulation

| B-Side | PPHP | wt % B-side |
|---|---|---|
| Polyether polyol #8 | 22.73 | 15.00 |
| Polyether polyol #1 | 22.73 | 15.00 |
| Polyester polyol #1 | 54.55 | 36.00 |
| PolyCat® 204 | 4.55 | 3.00 |
| Dabco® T-120 | 0.30 | 0.20 |
| Tegostab® B 8486 | 1.52 | 1.00 |
| TCPP | 25.16 | 16.60 |

TABLE 2-continued

Formulation

| B-Side | PPHP | wt % B-side |
|---|---|---|
| Added water | 2.12 | 1.40 |
| 1233zd | 17.88 | 11.80 |
| Total B Side: | 151.54 | 100.00 |
| ROH Index | 110 | |
| Isocyanate | 165.24 | |
| B/A | 0.92 | |
| Total Blowing, ml/gm | 21.6 | |

Example 3

Reactivity, gel time (seconds) and tack free time (seconds) were measured at the initial time and then 7 days and 14 days after aging at 50° C. Samples that were aged at 50° C. were weighed after they were removed from the oven to confirm that the loss of component in the B-side was negligible. A and B sides were mixed using an air driven mixer at about 4000 RPM for 5 seconds to ensure the mixing was thorough and foam quality was consistently good. Each formula was repeated at least once, and gel and tack free times were the average of duplicates; the standard deviation was typically about 1 second. The reactivity of the formula in Table 2 is summarized in Table 3-1.

TABLE 3

Polyol composition and pH of each component

| Polyol | PPHP | Apparent pH |
|---|---|---|
| Polyether polyol #8 | 22.72 | 8.59 |
| Polyether polyol #1 | 22.72 | 10.21 |
| Polyester polyol #1 | 54.51 | 4.74 |

TABLE 3-1

Reactivity (gel and tack free time) of initial, and 7 and 14 day aged at 50° C.

| Reactivity (seconds) | Initial | 7 days | 14 days |
|---|---|---|---|
| Gel time | 17 | 24 | 28 |
| Tack free time | 21 | 32 | 38 |

Table 3-1 shows that reactivity decreased as the time of aging increased, as indicated by the longer gel and tack free times. It is desired that the reactivity, particularly the gel time, change after 7 days of aging at 50° C., be less than 7 seconds, which is equivalent to about 2 to 3 months of stability under ambient condition. It is even more desired that the gel time change after 14 days of aging at 50° C. is less than 7 seconds, which is equivalent to 4 to 6 months of stability under ambient conditions. Typically, industrial foam producers require 2 to 6 months of storage stability for fully blended B-side. Obviously, the above formula has a stability of about 2 to 3 months, which is far short of the more desirable 4 to 6 months stability. US 2014/0113984 A1, paragraph [0026], shows that a catalyst such as Poly-Cat® 204, product of Air Products and Chemicals, may have a pH value of less than 7. However, PolyCat® 204 alone is not sufficient to render to the pre-mix the stability that is required.

Comparative Example 3A: Observed Stability of 1233zd Replacing HFC245fa in a Spray Type Formula

TABLE 3A

| Formula | | |
|---|---|---|
| | 245fa | 1233zd |
| Terate ® 3510 | 16.80 | 16.75 |
| Jeffol ® R-470-X | 7.35 | 7.32 |
| Jeffol ® SG-360 | 7.35 | 7.32 |
| Ethylene glycol | 0.73 | 0.73 |
| PMDETA (PolyCat ®-5) | 0.49 | 0.49 |
| DMCHA (PolyCat ®-8) | 0.98 | 0.98 |
| Dabco ® T-120 | 0.10 | 0.10 |
| Tegostab ® B 8486 | 0.49 | 0.49 |
| Saytex ® RB-79 | 4.90 | 4.88 |
| TCPP | 2.94 | 2.93 |
| Added water | 0.98 | 0.98 |
| 245fa | 5.88 | — |
| 1233zd | — | 5.74 |
| Total B Side: | 48.99 | 48.71 |
| ROH Index | 115 | 116 |
| Isocyanate | 51.0 | 51.3 |
| B/A | 0.96 | 0.95 |
| Total Blowing, ml/g | 22.0 | 22.0 |

The stability of the B-side blend was evaluated by comparing the reactivities of fresh and aged blends at 50° C. for two weeks, as shown in Table 3A-1

TABLE 3A-1

| Reactivity change after aging | | | | |
|---|---|---|---|---|
| | Initial | | 14 days | |
| Reactivity (seconds) | 245fa | 1233zd | 245fa | 1233zd |
| Cream time | 6 | 7 | 7 | 15 |
| Tack free time | 15 | 14 | 19 | 48 |
| Rise time | 23 | 22 | 28 | 64 |

The reactivity change of B-side blend containing 245fa is acceptable, however, the reactivity change of similar blend after replacing 245fa with 1233zd is not acceptable. It is known to people skillful in art that a 245fa blend is stable, as Table 3A-1 shows. US 2002/0040070 A1, paragraph [0020], states "Any suitable polyol, as would be apparent to those of skill in the art, may be used in the present invention." In other word, the prior art fails to teach that the apparent pH of an individual polyol has an impact on the stability of a B-side blend containing 1233zd.

Example 4. Replacing Polyether Polyol #1 with Polyether Polyols with Different Apparent pH Polyester polyol #1 and polyether polyol #8, and all other components in the B-side blends were kept constant; only polyether polyol #1 was replaced. Table 4 summarizes the gel time change.

TABLE 4

| Reactivity change after replacing polyether #1 polyol | | | | |
|---|---|---|---|---|
| | Polyether #1 Replacement | | Gel Time Change (s) | |
| Formula | Polyol | Apparent pH | 7 days | 14 days |
| 1 | Polyether #1 (control) | 10.21 | 6 | 11 |
| 2 | Polyether #11 | 11.56 | 10 | 16 |
| 3 | Polyether #12 | 10.68 | 6 | 12 |
| 4 | Polyether #10 | 10.23 | 3 | 9 |
| 5 | Polyether #9 | 9.58 | 6 | 13 |
| 6 | Polyether #2 | 10.55 | 6 | 11 |
| 7 | Polyether #7 | 10.05 | 6 | 10 |
| 8 | Polyether #3 | 7.36 | 3 | 7 |
| 9 | Polyether #4 | 7.26 | 4 | 7 |
| 10 | Polyether #5 | 7.34 | 5 | 10 |
| 11 | Polyether #6 | 7.30 | 5 | 6 |
| 12 | Polyether #15 | 7.39 | 2 | 4 |
| 13 | Polyether #16 | 7.47 | 2 | 3 |
| 14 | Polyether #13 | 6.00 | 3 | 5 |

The experimental data set forth in Table 4 demonstrate that if the polyol component contains a polyol having an apparent pH greater than 11.4 (as is the case for Formula 2, which contained a polyether polyol having an apparent pH of 11.56), the gel time increases significantly after the premix containing the polyol component and the halogenated hydroolefin blowing agent has been stored for 7 days or 14 days at 50° C. In contrast, smaller, commercially acceptable increases in gel time were observed when each polyol of the polyol component had an apparent pH less than 11.4 (as in Formula 1 and 3-14).

Examples 5-9

In these Examples, the effects of the weight ratio of polyester polyol to polyether polyol and the apparent pH of such polyols on the shelf stability of a polyol component were studied.

Example 5

In this Example, a polyether polyol having an apparent pH of 7.30 ("Polyol A-5") was employed as the polyether polyol in a polyol component, either as the sole polyol or in combination with varying amounts of a polyester polyol ("Polyol B").

Polyol A-5 was a sorbitol-initiated polyether polyol having a hydroxyl number of 490 mg KOH/g, an average functionality of 4.7, an average molecular weight of 700 Daltons, a hydroxyl equivalent weight of 115 Daltons and an apparent pH of 7.30.

Polyol B was an aromatic polyester polyol having a hydroxyl number of 295 mg KOH/g, an average functionality of 2.2 and an apparent pH of 4.74. The following Table 5-A describes the spray formula employed, while Tables 5-B and 5-C show the foaming results obtained as the weight proportion of polyester polyol to polyether polyol was varied.

TABLE 5-A

| B-Side | PHP | wt % B |
|---|---|---|
| Polyol A-5 | X | X |
| Polyol B | 100-X | 66-X |
| PolyCat ® 204 | 4.55 | 3.00 |

TABLE 5-A-continued

| B-Side | PHP | wt % B |
|---|---|---|
| Dabco ® T-120 | 0.30 | 0.20 |
| Tegostab ® B 8486 | 1.52 | 1.00 |
| TCPP | 25.15 | 16.60 |
| Added water | 2.12 | 1.40 |
| 1233zd | 17.88 | 11.80 |
| Total B Side: | 151.52 | 100.00 |
| ROH Index | 110 | |
| Isocyanate | 165.21 | |
| B/A | 0.92 | |
| Total Blowing, ml/gm | 21.6 | |

TABLE 5-B

Reaction time, 5 sec: @60° F.

| Initial Example No. (Formula type) | Cream time | Gel time | Tack free time | Rise time | Foam quality | Free rise density |
|---|---|---|---|---|---|---|
| Example 5-1 (Control) | 9 | 18 | 21 | 34 | OK | 1.78 |
| Example 5-2 (Polyester Polyol:Polyether Polyol = 100:0) | 9 | 16 | 19 | 34 | OK | 1.73 |
| Example 5-3 (Polyester Polyol:Polyether Polyol = 85:15) | 9 | 17 | 20 | 37 | OK | 1.74 |
| Example 5-4 (Polyester Polyol:Polyether Polyol = 70:30) | 9 | 18 | 22 | 39 | OK | 1.76 |
| Example 5-5 (Polyester Polyol:Polyether Polyol = 55:45) | 9 | 21 | 27 | 45 | OK | 1.83 |
| Example 5-6 (Polyester Polyol:Polyether Polyol = 35:65) | 9 | 24 | 33 | 48 | OK | 1.86 |
| Example 5-7 (Polyester Polyol:Polyether Polyol = 20:80) | 9 | 31 | 41 | 60 | OK | 1.88 |
| Example 5-8 (Polyester Polyol:Polyether Polyol = 0:100) | 11 | 38 | 49 | 68 | OK | 1.92 |

TABLE 5-C

| Example No. (Formula type) | % GT Change (7 days) | % GT Change (14 days) |
|---|---|---|
| Example 5-1 (Control) | 17 | 50 |
| Example 5-2 (Polyester Polyol:Polyether Polyol = 100:0) | 13 | 38 |
| Example 5-3 (Polyester Polyol:Polyether Polyol = 85:15) | 17 | 35 |
| Example 5-4 (Polyester Polyol:Polyether Polyol = 70:30) | 16 | 33 |
| Example 5-5 (Polyester Polyol:Polyether Polyol = 55:45) | 14 | 29 |
| Example 5-6 (Polyester Polyol:Polyether Polyol = 35:65) | 13 | 28 |
| Example 5-7 (Polyester Polyol:Polyether Polyol = 20:80) | 13 | 25 |
| Example 5-8 (Polyester Polyol:Polyether Polyol = 0:100) | 21 | 32 |

Example 6

In this Example, a polyether polyol having an apparent pH of 10.55 ("Polyol A-6") was employed as the polyether polyol in a polyol component, either as the sole polyol or in combination with varying amounts of a polyester polyol ("Polyol B").

Polyol A-6 was a sucrose/glycerin-initiated polyester polyol having an apparent pH of 10.55, a hydroxyl number of 490 mg KOH/g, an average functionality of 4.3, and an average molecular weight of 460 Daltons.

Polyol B was an aromatic polyester polyol having a hydroxyl number of 295 mg KOH/g, an average functionality of 2.2 and an apparent pH of 4.74.

The following Table 6-A describes the spray formula employed, while Tables 6-B and 6-C show the foaming results obtained as the weight proportion of polyester polyol to polyether polyol was varied.

TABLE 6-A

| B-Side | PHP | wt % B |
|---|---|---|
| Polyol A-6 | X | X |
| Polyol B | 100-X | 66-X |
| PolyCat ® 204 | 4.55 | 3.00 |
| Dabco ® T-120 | 0.30 | 0.20 |
| Tegostab ® B 8486 | 1.52 | 1.00 |
| TCPP | 25.15 | 16.60 |
| Added water | 2.12 | 1.40 |
| 1233zd | 17.88 | 11.80 |
| Total B Side: | 151.52 | 100.00 |
| ROH Index | 110 | |
| Isocyanate | 165.21 | |
| B/A | 0.92 | |
| Total Blowing, ml/gm | 21.6 | |

TABLE 6-B

Reaction time, 5 sec: @60° F.

| Initial Example No. (Formula type) | Cream time | Gel time | Tack free time | Rise time | Foam quality | Free rise density |
|---|---|---|---|---|---|---|
| Example 6-1 (Control) | 9 | 18 | 20 | 34 | OK | 1.82 |
| Example 6-2 (Polyester Polyol:Polyether Polyol = 100:0) | 8 | 16 | 18 | 31 | OK | 1.74 |

TABLE 6-B-continued

Reaction time, 5 sec: @60° F.

| Initial Example No. (Formula type) | Cream time | Gel time | Tack free time | Rise time | Foam quality | Free rise density |
|---|---|---|---|---|---|---|
| Example 6-3 (Polyester Polyol:Polyether Polyol = 85:15) | 9 | 17 | 20 | 35 | OK | 1.75 |
| Example 6-4 (Polyester Polyol:Polyether Polyol = 70:30) | 9 | 18 | 22 | 37 | OK | 1.78 |
| Example 6-5 (Polyester Polyol:Polyether Polyol = 55:45) | 9 | 23 | 28 | 43 | OK | 1.86 |
| Example 6-6 (Polyester Polyol:Polyether Polyol = 35:65) | 10 | 26 | 37 | 49 | OK | 1.92 |
| Example 6-7 (Polyester Polyol:Polyether Polyol = 20:80) | 10 | 33 | 45 | 61 | OK | 1.95 |
| Example 6-8 (Polyester Polyol:Polyether Polyol = 0:100) | 12 | 48 | 68 | 85 | OK | 1.98 |

TABLE 6-C

| Example No. (Formula type) | % GT Change (7 days) | % GT Change (14 days) |
|---|---|---|
| Example 6-1 (Control) | 27 | 61 |
| Example 6-2 (Polyester Polyol:Polyether Polyol = 100:0) | 25 | 31 |
| Example 6-3 (Polyester Polyol:Polyether Polyol = 85:15) | 24 | 47 |
| Example 6-4 (Polyester Polyol:Polyether Polyol = 70:30) | 33 | 55 |
| Example 6-5 (Polyester Polyol:Polyether Polyol = 55:45) | 26 | 48 |
| Example 6-6 (Polyester Polyol:Polyether Polyol = 35:65) | 38 | Foam collapsed |
| Example 6-7 (Polyester Polyol:Poly-ether Polyol = 20:80) | 36 | Foam collapsed |
| Example 6-8 (Polyester Polyol:Polyether Polyol = 0:100) | 22 | Foam collapsed |

Example 7

In this Example, a polyether polyol having an apparent pH of 7.26 ("Polyol A-7") was employed as the polyether polyol in a polyol component, either as the sole polyol or in combination with varying amounts of a polyester polyol ("Polyol B").

Polyol A-7 was an aromatic amine/DEG-initiated polyether polyol having an average molecular weight of 465 Daltons, a hydroxyl number of 530 mg KOH/g, an average functionality of 2.9, a hydroxyl equivalent weight of 112 Daltons, and an apparent pH of 7.26.

Polyol B was an aromatic polyester polyol having a hydroxyl number of 295 mg KOH/g, an average functionality of 2.2 and an apparent pH of 4.74.

The following Table 7-A describes the spray formula employed, while Tables 7-B and 7-C show the foaming results obtained as the weight proportion of polyester polyol to polyether polyol was varied.

TABLE 7-A

| B-Side | PHP | wt % B |
|---|---|---|
| Polyol A-7 | X | X |
| Polyol B | 100-X | 66-X |
| PolyCat ® 204 | 4.55 | 3.00 |
| Dabco ® T-120 | 0.30 | 0.20 |
| Tegostab ® B 8486 | 1.52 | 1.00 |
| TCPP | 25.15 | 16.60 |
| Added water | 2.12 | 1.40 |
| 1233zd | 17.88 | 11.80 |
| Total B Side: | 151.52 | 100.00 |
| ROH Index | 110 | |
| Isocyanate | 165.21 | |
| B/A | 0.92 | |
| Total Blowing, ml/gm | 21.6 | |

TABLE 7-B

Reaction time, 5 sec: @60° F.

| Initial Example No. (Formula type) | Cream time | Gel time | Tack free time | Rise time | Foam quality | Free rise density |
|---|---|---|---|---|---|---|
| Example 7-1 (Control) | 9 | 18 | 21 | 38 | OK | 1.77 |
| Example 7-2 (Polyester Polyol:Polyether Polyol = 100:0) | 9 | 17 | 19 | 34 | OK | 1.73 |
| Example 7-3 (Polyester Polyol:Polyether Polyol = 85:15) | 9 | 16 | 18 | 32 | OK | 1.72 |
| Example 7-4 (Polyester Polyol:Polyether Polyol = 70:30) | 9 | 17 | 19 | 34 | OK | 1.75 |
| Example 7-5 (Polyester Polyol:Polyether Polyol = 55:45) | 9 | 17 | 20 | 35 | OK | 1.80 |
| Example 7-6 (Polyester Polyol:Polyether Polyol = 35:65) | 8 | 17 | 22 | 35 | OK | 1.86 |
| Example 7-7 (Polyester Polyol:Polyether Polyol = 20:80) | 8 | 19 | 24 | 40 | OK | 1.88 |
| Example 7-8 (Polyester Polyol:Polyether Polyol = 0:100) | 8 | 20 | 27 | 42 | OK | 1.95 |

TABLE 7-C

| Example No. (Formula type) | % GT Change (7 days) | % GT Change (14 days) |
|---|---|---|
| Example 7-1 (Control) | 28 | 50 |
| Example 7-2 (Polyester Polyol:Polyether Polyol = 100:0) | 18 | 29 |
| Example 7-3 (Polyester Polyol:Polyether Polyol = 85:15) | 13 | 31 |
| Example 7-4 (Polyester Polyol:Polyether Polyol = 70:30) | 6 | 12 |
| Example 7-5 (Polyester Polyol:Polyether Polyol = 55:45) | 6 | 12 |
| Example 7-6 (Polyester Polyol:Polyether Polyol = 35:65) | 18 | 24 |
| Example 7-7 (Polyester Polyol:Polyether Polyol = 20:80) | 11 | 21 |
| Example 7-8 (Polyester Polyol:Polyether Polyol = 0:100) | 15 | 20 |

Example 8

In this Example, an aromatic polyether/ester polyol ("Polyol A-8") was employed as the polyether polyol in a polyol component, either as the sole polyol or in combination with varying amounts of a polyester polyol ("Polyol B").

Polyol A-8 is an aromatic polyether/ester polyol having a hydroxyl number of 395 mg KOH/g and an apparent pH of 7.47.

Polyol B was an aromatic polyester polyol having a hydroxyl number of 295 mg KOH/g, an average functionality of 2.2 and an apparent pH of 4.74.

The following Table 8-A describes the spray formula employed, while Tables 8-B and 8-C show the foaming results obtained as the weight proportion of polyester polyol to polyether polyol was varied.

TABLE 8-A

| B-Side | PHP | wt % B |
|---|---|---|
| Polyol A-8 | X | X |
| Polyol B | 100-X | 66-X |
| PolyCat ® 204 | 4.55 | 3.00 |
| Dabco ® T-120 | 0.30 | 0.20 |
| Tegostab ® B 8486 | 1.52 | 1.00 |
| TCPP | 25.15 | 16.60 |
| Added water | 2.12 | 1.40 |
| 1233zd | 17.88 | 11.80 |
| Total B Side: | 151.52 | 100.00 |
| ROH Index | 110 | |
| Isocyanate | 165.21 | |
| B/A | 0.92 | |
| Total Blowing, ml/gm | 21.6 | |

TABLE 8-B

| Initial Example No. (Formula type) | Reaction time, 5 sec: @60° F. | | | | | |
|---|---|---|---|---|---|---|
| | Cream time | Gel time | Tack free time | Rise time | Foam quality | Free rise density |
| Example 8-1 (Control) | 9 | 18 | 21 | 38 | OK | 1.92 |
| Example 8-2 (Polyester Polyol:Polyether Polyol = 100:0) | 9 | 17 | 19 | 35 | OK | 1.92 |
| Example 8-3 (Polyester Polyol:Polyether Polyol = 85:15) | 9 | 16 | 18 | 32 | OK | 1.84 |
| Example 8-4 (Polyester Polyol:Polyether Polyol = 70:30) | 8 | 14 | 15 | 29 | OK | 1.82 |
| Example 8-5 (Polyester Polyol:Polyether Polyol = 55:45) | 8 | 13 | 14 | 28 | OK | 1.80 |
| Example 8-6 (Polyester Polyol:Polyether Polyol = 35:65) | 8 | 14 | 15 | 28 | OK | 1.91 |
| Example 8-7 (Polyester Polyol:Polyether Polyol = 20:80) | 8 | 15 | 16 | 31 | OK | 1.68 |
| Example 8-8 (Polyester Polyol:Polyether Polyol = 0:100) | 8 | 16 | 18 | 33 | OK | 1.68 |

TABLE 8-C

| Example No. (Formula type) | % GT Change (7 days) | % GT Change (14 days) |
|---|---|---|
| Example 8-1 (Control) | 22 | 44 |
| Example 8-2 (Polyester Polyol:Polyether Polyol = 100:0) | 6 | 29 |
| Example 8-3 (Polyester Polyol:Polyether Polyol = 85:15) | 6 | 19 |
| Example 8-4 (Polyester Polyol:Polyether Polyol = 70:30) | 14 | 21 |
| Example 8-5 (Polyester Polyol:Polyether Polyol = 55:45) | 23 | 23 |
| Example 8-6 (Polyester Polyol:Polyether Polyol = 35:65) | 0 | 7 |
| Example 8-7 (Polyester Polyol:Polyether Polyol = 20:80) | 0 | 0 |
| Example 8-8 (Polyester Polyol:Polyether Polyol = 0:100) | 0 | 0 |

Example 9

In this Example, a polyether polyol ("Polyol A-9") having an apparent pH of 8.59 was employed as the polyether polyol in a polyol component, either as the sole polyol or in combination with varying amounts of a polyester polyol ("Polyol B").

Polyol A-9 is a sucrose/glycerin-initiated polyether polyol having a hydroxyl number of 360 mg KOH/g and an apparent pH of 8.59.

Polyol B was an aromatic polyester polyol having a hydroxyl number of 295 mg KOH/g, an average functionality of 2.2 and an apparent pH of 4.74.

The following Table 9-A describes the spray formula employed, while Tables 9-B and 9-C show the foaming results obtained as the weight proportion of polyester polyol to polyether polyol was varied.

TABLE 9-A

| B-Side | PHP | wt % B |
| --- | --- | --- |
| Polyol A-9 | X | X |
| Polyol B | 100-X | 66-X |
| PolyCat ® 204 | 4.55 | 3.00 |
| Dabco ® T-120 | 0.30 | 0.20 |
| Tegostab ® B 8486 | 1.52 | 1.00 |
| TCPP | 25.15 | 16.60 |
| Added water | 2.12 | 1.40 |
| 1233zd | 17.88 | 11.80 |
| Total B Side: | 151.52 | 100.00 |
| ROH Index | 110 | |
| Isocyanate | 165.21 | |
| B/A | 0.92 | |
| Total Blowing, ml/gm | 21.6 | |

TABLE 9-B

| | Reaction time, 5 sec: @60° F. | | | | | |
| --- | --- | --- | --- | --- | --- | --- |
| Initial Sample ID (Formula type) | Cream time | Gel time | Tack free time | Rise time | Foam quality | Free rise density |
| Example 9-1 (Control) | 9 | 18 | 21 | 36 | OK | 1.82 |
| Example 9-2 (Polyester Polyol:Polyether Polyol = 100:0) | 9 | 17 | 20 | 33 | OK | 1.73 |
| Example 9-3 (Polyester Polyol:Polyether Polyol = 85:15) | 9 | 18 | 22 | 37 | OK | 1.73 |
| Example 9-4 (Polyester Polyol:Polyether Polyol = 70:30) | 9 | 19 | 26 | 39 | OK | 1.80 |
| Example 9-5 (Polyester Polyol:Polyether Polyol = 55:45) | 9 | 21 | 33 | 45 | OK | 1.81 |
| Example 9-6 (Polyester Polyol:Polyether Polyol = 35:65) | 10 | 28 | 42 | 57 | OK | 1.82 |
| Example 9-7 (Polyester Polyol:Polyether Polyol = 20:80) | 10 | 33 | 49 | 67 | OK | 1.83 |
| Example 9-8 (Polyester Polyol:Polyether Polyol = 0:100) | 11 | 47 | 68 | 85 | OK | 1.85 |

TABLE 9-C

| Sample ID (Formula type) | % GT Change (7 days) | % GT Change (14 days) |
| --- | --- | --- |
| Example 9-1 (Control) | 28 | 56 |
| Example 9-2 (Polyester Polyol:Polyether Polyol = 100:0) | 18 | 35 |
| Example 9-3 (Polyester Polyol:Polyether Polyol = 85:15) | 22 | 41 |
| Example 9-4 (Polyester Polyol:Polyether Polyol = 70:30) | 32 | 47 |
| Example 9-5 (Polyester Polyol:Polyether Polyol = 55:45) | 38 | 43 |
| Example 9-6 (Polyester Polyol:Polyether Polyol = 35:65) | 21 | 36 |
| Example 9-7 (Polyester Polyol:Polyether Polyol = 20:80) | 21 | 39 |
| Example 9-8 (Polyester Polyol:Polyether Polyol = 0:100) | Foam collapsed | Foam collapsed |

The results observed in Examples 5-9 are summarized in the following Tables 10-A, B and C. The gel times and pre-mix stabilities (change in gel time upon aging) measured for formulations using different blends of polyester polyol and polyether polyol were qualitatively scored as follows:

****=very favorable: gel time on Day 0 very similar to gel time of formulation containing only polyester polyol and gel time did not change significantly after 7 and 14 days of aging at 50° C.

***=favorable: gel time on Day 0 similar to gel time of formulation containing only polyester polyol and gel time did not change substantially after 7 and 14 days of aging at 50° C.

**=acceptable: gel time on Day 0 somewhat longer than gel time of formulation containing only polyester polyol and/or gel time increased somewhat after 7 and 14 days of aging at 50° C.

*=not acceptable: gel time on Day 0 substantially longer than gel time of formulation containing only polyester polyol and/or gel time after 7 and 14 days at 50° C. increased substantially.

TABLE 10-A

| Polyester Polyol | Polyether Polyol | Ex. 6 Gel Time (s) Day 0 | Ex. 6 Gel Time Change (%) Day 7 | Ex. 6 Gel Time Change (%) Day 14 | Ex. 9 Gel Time (s) Day 0 | Ex. 9 Gel Time Change (%) Day 7 | Ex. 9 Gel Time Change (%) Day 14 |
|---|---|---|---|---|---|---|---|
| 100 | 0 | 16 | 25 | 31 | 17 | 18 | 35 |
| 85 | 15 | 17*** | 24*** | 47*** | 18*** | 22*** | 41*** |
| 70 | 30 | 18** | 33** | 55** | 19*** | 32*** | 47*** |
| 55 | 45 | 23** | 26** | 48** | 21** | 38** | 43* |
| 35 | 65 | 26* | 38* | NA* | 28** | 21** | 36** |
| 20 | 80 | 33* | 36* | NA* | 33** | 21** | 39** |
| 0 | 100 | 48* | 22* | NA* | 47* | NA* | NA* |

TABLE 10-B

| Polyester Polyol | Polyether Polyol | Ex. 5 Gel Time (s) Day 0 | Ex. 5 Gel Time Change (%) Day 7 | Ex. 5 Gel Time Change (%) Day 14 | Ex. 7 Gel Time (s) Day 0 | Ex. 7 Gel Time Change (%) Day 7 | Ex. 7 Gel Time Change (%) Day 14 |
|---|---|---|---|---|---|---|---|
| 100 | 0 | 16 | 13 | 38 | 17 | 18 | 29 |
| 85 | 15 | 17*** | 17*** | 35*** | 16*** | 13*** | 31*** |
| 70 | 30 | 18*** | 16*** | 33*** | 17**** | 6**** | 12**** |
| 55 | 45 | 21** | 14** | 29** | 17**** | 6**** | 12**** |
| 35 | 65 | 24** | 13** | 28** | 17**** | 18**** | 24**** |
| 20 | 80 | 31** | 13** | 25** | 19*** | 11*** | 21*** |
| 0 | 100 | 38** | 21** | 32** | 20*** | 15*** | 20*** |

TABLE 10-C

| Polyester Polyol | Polyether Polyol | Ex. 8 Gel Time (s) Day 0 | Ex. 8 Gel Time Change (%) Day 7 | Ex. 8 Gel Time Change (%) Day 14 |
|---|---|---|---|---|
| 100 | 0 | 17 | 6 | 29 |
| 85 | 15 | 16**** | 6**** | 19**** |
| 70 | 30 | 14**** | 14**** | 21**** |
| 55 | 45 | 13**** | 23**** | 23**** |
| 35 | 65 | 14**** | 0**** | 7**** |
| 20 | 80 | 15**** | 0**** | 0**** |
| 0 | 100 | 16**** | 0**** | 0**** |

What is claimed is:

1. A polyol pre-mix comprising:
    (a) a blowing agent selected from the group consisting of HCFO-1233zd and a combination of HCFO-1223zd and at least one additional blowing agent;
    (b) a polyol blend consisting of:
        from 20% to 70% by weight at least one polyester polyol, based on the total weight of the polyol blend; and
        from 30% to 80% by weight at least one additional polyol selected from the group consisting of polyether polyols and polyether/ester polyols, based on the total weight of the polyol blend;
    (c) from 0.5 ppm to 5% by weight catalyst, based on the total weight of the polyol pre-mix, the catalyst consisting of least one tetraalkyl guanidine catalyst and at least one non-amine catalyst; and
    (d) optionally, at least one additive selected from the group consisting of surfactants, flame retardant/suppressors, acid scavengers, radical scavengers, fillers, and combinations thereof,
wherein:
    the polyol blend has an apparent pH of at least 4 and no greater than 9.

2. The polyol pre-mix of claim 1, wherein:
    each polyester polyol in the polyol blend has an apparent pH from 4 to 5; and
    each additional polyol in the polyol blend has an apparent pH from 7 to 9.

3. The polyol pre-mix of claim 1, wherein the at least one non-amine catalyst is an organometallic compound.

4. The polyol pre-mix of claim 1, wherein the at least one non-amine catalyst is an organometallic compound containing tin.

5. The polyol pre-mix of claim 1, wherein each polyester polyol is an aromatic polyester polyol having a hydroxyl number of 200 to 450 mg KOH/g and a functionality of 2 to 3.

6. The polyol pre-mix of claim 1, wherein: the at least one additional polyol is selected from the group consisting of polyether polyols; each polyether polyol is selected from the group consisting of:
    sorbitol-initiated polyether polyols having hydroxyl numbers from 440 to 540 mg KOH/g, functionalities from 4.4 to 5.8, and apparent pH from 7 to 9; aromatic amine/diethylene glycol-initiated polyether polyols having hydroxyl numbers from 275 to 550 mg KOH/g and functionalities from 3.2 to 4.0, and apparent pH from 7 to 9; sucrose/glycerin-initiated polyether polyols having hydroxyl numbers of 300 to 600 mg KOH/g and functionalities from 4 to 7, and apparent pH from 7 to 9; and combinations thereof.

7. The polyol pre-mix of claim 1, wherein:
    the at least one additional polyol is selected from the group consisting of polyether/ester polyols;
    each polyether/ester polyol is a polyol containing both oxyalkylene and ester-containing units; and
    each polyether/ester polyol has a hydroxyl number from 275 to 575 mg KOH/g and a functionality from 2.8 to 3.5.

8. The polyol pre-mix of claim 7, wherein:
the at least one polyester polyol is an aromatic polyester polyol having an apparent pH from 4 to 5; and
the at least one additional polyol is a polyether/ester polyol having a hydroxyl number from 275 to 575 mg KOH/g, a functionality from 2.8 to 3.5, and an apparent pH from 7 to 9.

9. The polyol pre-mix of claim 1, wherein each polyether polyol of the polyol blend has a number average molecular weight of from 250 to 6500 Daltons and a viscosity from 400 cPs to 21,000 cPs at 25° C.

10. The polyol pre-mix of claim 1, consisting of the blowing agent, the polyol blend, the catalyst, a non-silicone surfactant, and a flame retardant/suppressor.

11. An aged polyol pre-mix consisting of a polyol pre-mix according to claim 1 subjected to an aging equivalent to maintaining the polyol pre-mix at 50° C. for an aging period of 7 days to 14 days.

12. The aged polyol pre-mix of claim 11, wherein the aging comprises storing the polyol pre-mix at 50° C. for 14 days.

13. The aged polyol pre-mix of claim 11, wherein the aging comprises storing the polyol pre-mix at 23° C. for 6 months.

14. A polyol pre-mix comprising:
(a) a blowing agent selected from the group consisting of HCFO-1233zd and a combination of HCFO-1223zd and at least one additional blowing agent;
(b) a polyol blend consisting of:
from 20% to 80% by weight at least one polyester polyol, based on the total weight of the polyol blend; and
from 20% to 80% by weight at least one additional polyol selected from the group consisting of polyether polyols and polyether/ester polyols, based on the total weight of the polyol blend;
(c) from 0.5 ppm to 5% by weight of a combination of at least one tetraalkyl guanidine catalyst and at least one non-amine catalyst, based on the total weight of the polyol pre-mix; and
(d) optionally, at least one additive selected from the group consisting of surfactants, flame retardant/suppressors, acid scavengers, radical scavengers, fillers, and combinations thereof,
wherein each polyol of the polyol blend has an apparent pH of at least 3 but no greater than 11.4;
wherein the polyol blend comprises a polyester polyol having an apparent pH of 4 to 5, and a polyether polyol or polyether/polyester polyol having an apparent pH of 7 to 11.4, and wherein:

if the polyether polyol or polyether/polyester polyol has an apparent pH of 7 to 8, the amount of polyether polyol or polyether/polyester polyol relative to the total polyol blend is up to 80% by weight;
if the polyether polyol or polyether/polyester polyol has an apparent pH of greater than 8 to 9, the amount of polyether polyol or polyether/polyester polyol relative to the total polyol blend is not more than 80% by weight;
if the polyether polyol or polyether/polyester polyol has an apparent pH of greater than 9 to 10, the amount of polyether polyol or polyether/polyester polyol relative to the total polyol blend is not more than 60% by weight; and
if the polyether polyol or polyether/polyester polyol has an apparent pH of greater than 10 to 11.4, the amount of polyether polyol or polyether/polyester polyol relative to the total polyol blend is not more than 45% by weight.

15. The polyol pre-mix of claim 14, wherein:
if the polyether polyol or polyether/polyester polyol has an apparent pH of 7 to 8, the amount of polyether polyol or polyether/polyester polyol relative to the total polyol blend is not more than 70% by weight;
if the polyether polyol or polyether/polyester polyol has an apparent pH of greater than 8 to 9, the amount of polyether polyol or polyether/polyester polyol relative to the total polyol blend is not more than 40% by weight;
if the polyether polyol or polyether/polyester polyol has an apparent pH of greater than 9 to 10, the amount of polyether polyol or polyether/polyester polyol relative to the total polyol blend is not more than 30% by weight; and
if the polyether polyol or polyether/polyester polyol has an apparent pH of greater than 10 to 11.4, the amount of polyether polyol or polyether/polyester polyol relative to the total polyol blend is not more than 25% by weight.

16. The polyol pre-mix of claim 14, wherein each polyol of the polyol blend has a viscosity of from 400 to 60,000 cps at 25° C., wherein each polyol of the polyol blend has a number average molecular weight of from 250 to 6500 Daltons, or both.

17. The polyol pre-mix of claim 14, wherein the polyester polyol contains less than 60 ppm Sb.

* * * * *